United States Patent [19]
Phillips

[11] 3,929,292
[45] Dec. 30, 1975

[54] APPARATUS FOR SYNCHRONIZING THE ROTATIONAL SPEEDS OF A PAIR OF INDEPENDENTLY DRIVEN REVERSELY ROTATABLE SHAFTS

[75] Inventor: Lyle C. Phillips, Cedar Rapids, Iowa

[73] Assignee: Henderson Manufacturing Co., Cedar Rapids, Iowa

[22] Filed: Dec. 9, 1974

[21] Appl. No.: 530,493

[52] U.S. Cl. ............... 239/685; 222/178; 214/83.36
[51] Int. Cl.² .......................................... A01C 15/00
[58] Field of Search ......... 214/83.36; 239/155, 156, 239/157, 158, 685, 677; 222/177, 178; 198/110; 137/27, 48, 30

[56] References Cited
UNITED STATES PATENTS 3,441,039  4/1969  Rawson........................... 239/155 X
3,693,838  9/1972  Haker et al..................... 239/155 X

*Primary Examiner*—Albert J. Makay
*Attorney, Agent, or Firm*—Rudolph L. Lowell

[57] ABSTRACT

The synchronizing apparatus functions to sense the difference in the relative rotational speeds of a pair of independently driven reversely rotated shafts, and to translate this difference in rotational speeds into an output motion for an actuating member. This output motion is utilized to adjust the rotational speed of one of the driven shafts to a predetermined function or ratio of the rotational speed of the other driven shaft. This synchronization of the rotational speeds of the pair of shafts at the predetermined speed ratio is attained when the output motion of the actuating member is reduced to zero or rendered non-existent.

4 Claims, 8 Drawing Figures

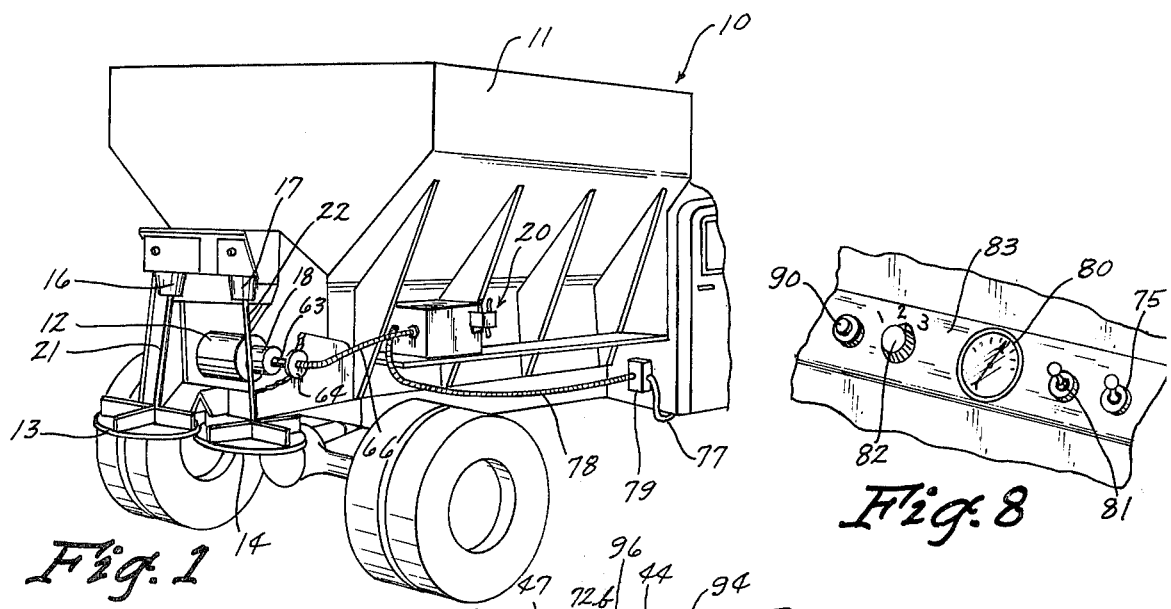
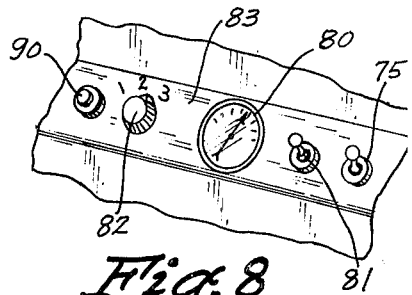
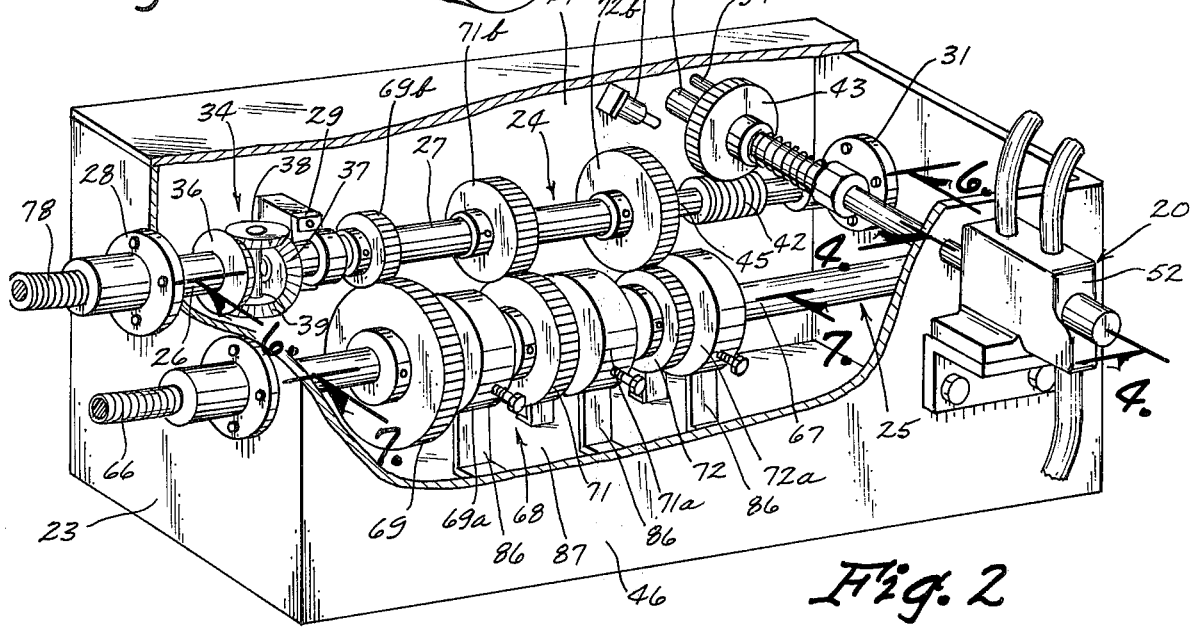
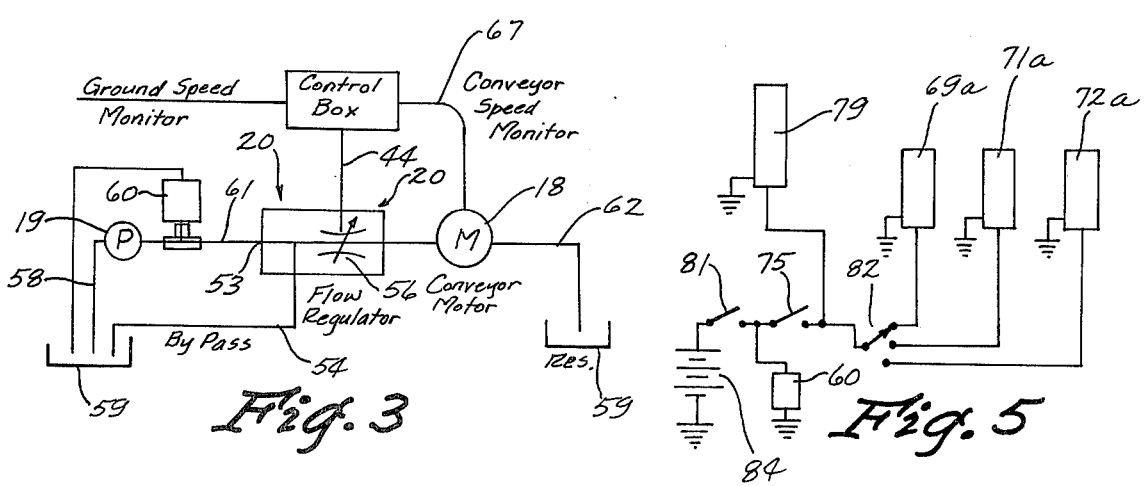
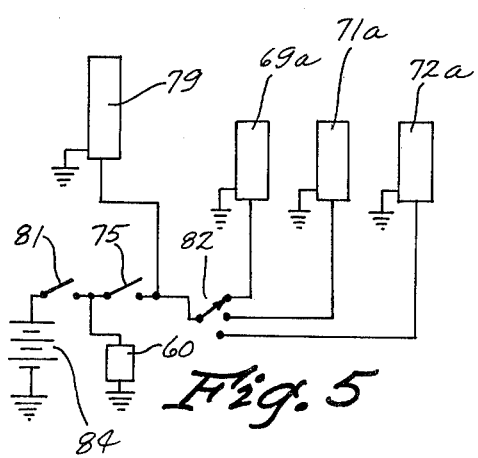

3,929,292

APPARATUS FOR SYNCHRONIZING THE ROTATIONAL SPEEDS OF A PAIR OF INDEPENDENTLY DRIVEN REVERSELY ROTATABLE SHAFTS

SUMMARY OF THE INVENTION

The apparatus is of a compact and rugged construction and readily adapted for installation on vehicles for distributing bulk materials such as fertilizers, sand and the like where the rate of material distribution is in a direct ratio with the rate of linear travel of the vehicle. Since the rate and pattern of discharge for a particular material to be spread, relative to the rate of linear travel of the vehicle, is predetermined the apparatus is initially manually adjusted to provide for the desired ratio of material discharge at the given rate of vehicle linear travel. This ratio is then automatically attained when the vehicle is operated at any given rate of linear travel. All adjustments are conveniently accessible for control by the vehicle operator, and adjustments can be made or varied while the vehicle is moving.

BRIEF DESCRIPTION OF THE DRAWING

FIG. 1 is a perspective view of the rear portion of a bulk material distributing truck showing the assembly therewith of the synchronizing apparatus of this invention;

FIG. 2 is a perspective view of the apparatus with parts broken away and shown in section to more clearly show its construction;

FIG. 3 is a schematic diagram of the fluid power transmission system for one of the driven shafts of the apparatus and includes the fluid control valve shown in FIG. 2;

FIG. 5 is a circuit diagram for the electrical units that form part of the apparatus;

FIG. 8 is a perspective view of a portion of the instrument panel located within the cab of the truck.

DETAIL DESCRIPTION OF THE INVENTION

Figure 4:
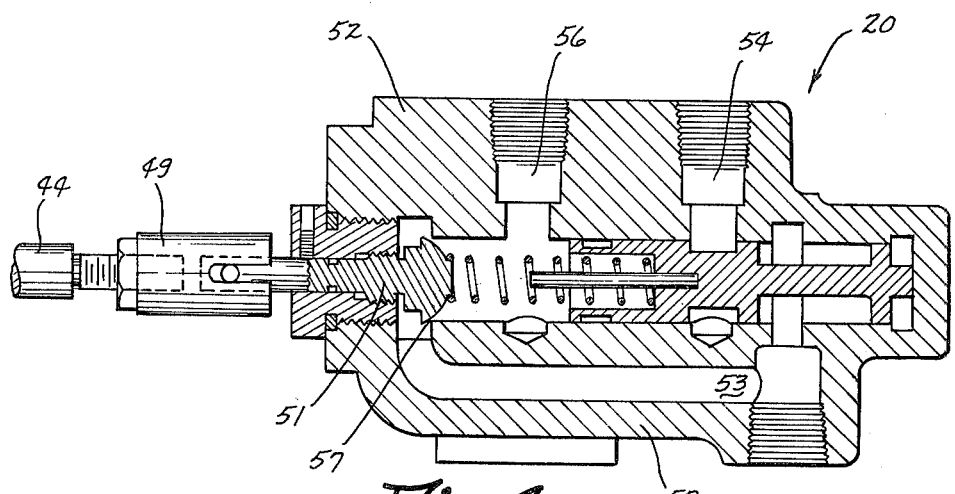
FIG. 4 is a longitudinal sectional view of the fluid flow regulator valve taken on line 4—4 of FIG. 2.

Referring to the drawing, there is shown in FIG. 1, a motor vehicle 10, illustrated as a bulk material handling truck, which includes a flare type box 11 and a material unloader conveyor 12. A pair of broadcasters or fans 13 and 14 are mounted on the box 11 adjacent the discharge end of the conveyor 12 and function to distribute the material from the conveyor onto the ground surface. Corresponding to the fans 13 and 14 are a pair of series connected hydraulic fluid motors 16 and 17 which are connected to the fans by means of drive shafts 21 and 22, respectively. An oil pump unit (not shown) driven from a power take off shaft of the truck engine (not shown) supplies fluid under pressure to the fan motors 16 and 17.

The conveyor 12 is driven by a hydraulic fluid motor 18 which is operated from an engine driven pump 19 (FIG. 3), the output flow of which, to the motor 18, is controlled by a fluid flow regulator valve unit 20 that forms part of the synchronizing apparatus of this invention.

As shown in FIG. 2, the synchronizer apparatus includes a housing 23 of a generally box shape for a pair of axially aligned shaft assemblies 24 and 25 arranged in an end to end spaced relation longitudinally of the housing 23. The shaft assembly 24 (FIGS. 2 and 6) is comprised of a driven shaft 26 which is in driving connection, in any suitable manner, with the truck speedometer 30 (FIG. 8) so as to be driven in direct response to the linear rate of travel of the truck and will hereinafter be referred to as the ground speed monitor shaft. The shaft assembly 24 is comprised of a first tubular shaft 27 arranged in an axially spaced relation with the ground speed monitor shaft 26 and will hereinafter be referred to as the idler or conveyor driven shaft. The shaft 26 (FIG. 2) is rotatably supported in the housing 23 by a bearing 28 and the ground speed monitor shaft by bearings 29 and 31.

Rotatable within the bore 32 (FIG. 6) of the idler shaft 27 and extended axially outwardly from opposite ends of the shaft 27, is an actuating shaft 33. Interposed between the adjacent ends of the shafts 26, 27 and 33 and in operative engagement with all three of the shafts 26, 27 and 33 is a sensing unit 34. This unit 34 determines or senses the difference in relative rotational speeds of the shafts 26 and 27 and then translates this speed variation into a rotary motion of the actuating shaft 33.

Figure 6:
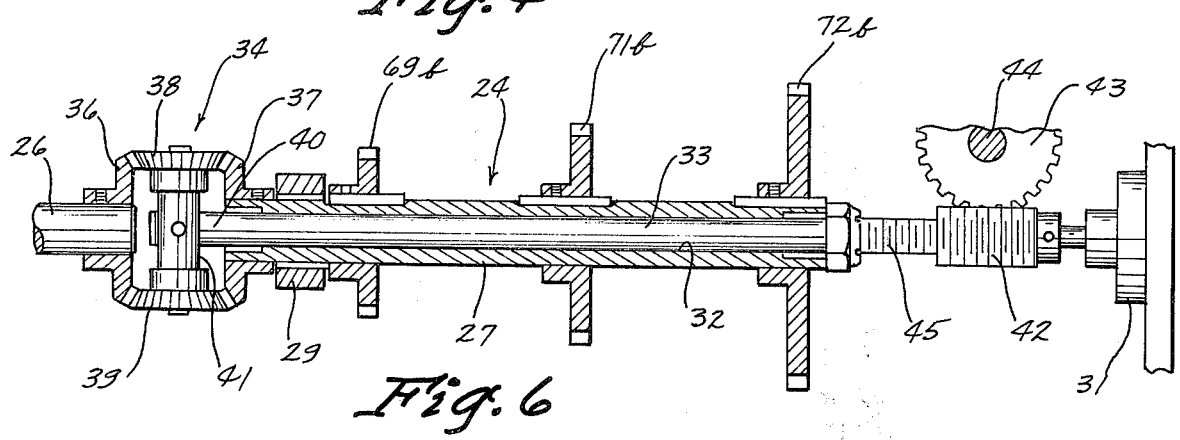
FIGS. 6 and 7 are enlarged sectional views as seen on the lines 6—6 and 7—7, respectively, in FIG. 2.

As illustrated in FIGS. 2 and 6, the sensing unit 34 includes a pair of oppositely arranged bevel gears 36 and 37 corresponding to and mounted on the adjacent ends of the shafts 26 and 27, respectively. Located between and in meshed engagement with each of the gears 36 and 37 is a pair of oppositely arranged beveled gears 38 and 39 which are rotatably supported on a bearing assembly 41 mounted on and extended transversely of the axis of the actuating shaft 33 on the input end 40 thereof located between the spaced adjacent ends of the shafts 26 and 27. With the shafts 26 and 27 being reversely rotatable, any variation in the rotational speeds thereof and in turn of the bevel gears 36 and 37 will cause a rotational movement of the bearing assembly 41 about the common axis of the shafts 26, 27 and 33. It is apparent that this rotation of the bearing assembly 41 in turn provides for a rotational movement of the actuating shaft 33.

The output end 45 of the actuating shaft 33 (FIGS. 2 and 6) is provided with a worm 42 that is in meshed engagement with a worm gear 43 carried on a shaft 44 extended transversely of the housing 23. The shaft 44 is rotatably supported in the housing sidewalls 46 and 47 with one end 48 thereof projected outwardly from the sidewall 46 for connection through a coupling unit indicated 49 (FIG. 4) with an adjustable screw 51 of the flow regulator valve 20. A housing 52 for the regulator valve 20 has an inlet passage 53 open to a bypass passage 54 and to a regulated flow passage 56 which is connectible to the inlet of the hydraulic motor 18. The adjustable screw 51 is reversely rotated by the reversely rotatable actuating shaft 33 to vary the restricted opening 57 between the inlet passage 53 and the regulated flow passage 56. For a detailed description of the flow regulating valve 20, reference is made to U.S. Pat. No. 3,167,915.

As thus far described, and as illustrated in FIG. 3, the inlet 58 of the pump 19 is connected to a liquid or oil reservoir 59 with the oil under pressure from the pump outlet 61 being supplied through a solenoid valve 60, normally open to the inlet passage means 53 of the flow regulator valve 20, for a divided flow through the bypass 54 and regulated flow passage 56 in amounts corresponding to the adjustment of the screw 51 in response to the output rotary motion of the actuating shaft 33. The regulated liquid flow supplied to the hydraulic motor 18 from the regulated flow passage 56 is returned to the reservoir 59 from the motor outlet 62. It is seen, therefore, that the volume rate of liquid supplied to the hydraulic motor 18 is in direct response to the rotational movement of the actuating shaft 33 and in turn to the difference in relative rotational speeds of the ground speed monitor shaft 26 and idler shaft 27.

The hydraulic motor shaft 63 is coupled through a connector 64 (FIG. 1) to a flexible shaft 66 which in turn is directly connected to a shaft 67 of a conveyor speed monitoring unit 68 (FIG. 2). The shaft 67, hereinafter referred to as the conveyor speed monitor shaft, is arranged longitudinally of the housing 23 in a spaced parallel relation with the shaft assemblies 24 and 25. A plurality of gears 69, 71 and 72 of relatively varying sizes are rotatably mounted in an axially spaced relation on the shaft 67. Each gear 69, 71 and 72 is operatively associated with a corresponding electric clutch assembly 69a, 71a and 72a. On energization of a selected clutch unit the gear corresponding thereto is connected for rotation with the conveyor speed monitor shaft 67.

The idler shaft 27 is provided with a plurality of axially spaced gears 69b, 71b and 72b of varying sizes corresponding to the gears 69, 71 and 72, respectively, for selective driving engagement therewith. Thus, for example, on energization of the electric clutch unit 69a for the gear 69, only the gear 69b of the shaft 27 is in driving engagement with the shaft 67. It is seen, therefore, that the conveyor speed monitor shaft 67 of the monitoring unit 68 is selectively engageable in a driving relation with the idler shaft 27 in a rotational speed ratio dependent upon which of the gears 69, 71 and 72 is in driving engagement with a corresponding gear on the shaft 27.

Connection of the truck speedometer cable 77 (FIG. 1) with a flexible cable 78 connected to the ground speed monitor shaft 26 is controlled through an electric clutch unit 79. As shown in FIG. 5, the electrical control system for the synchronizer apparatus includes a master control switch 81, a control switch 75 for the electric clutch 79 and a selector switch unit 82 for the clutch units 69a, 71a and 72a all of which may be mounted on the instrument panel 83 of the truck 10, as illustrated in FIG. 8. The switches 81, 75 and 82 are connected in that order in series from a battery 84. The closing of the master switch 81 automatically provides for the energization of the solenoid valve 60 to its normally open position.

In the use of the synchronizing apparatus of this invention, the predetermined speed ratio of the conveyor speed monitor shaft 67 and ground speed monitor shaft 26, corresponding to the bulk material to be spread, is set by adjustment of the selector switch unit 82. The master switch 81 is then closed to connect the speedometer cable 77 with the ground speed monitor shaft 26 through the electric clutch unit 81 and to energize a clutch unit 69a, 71a or 72a as selected by the selector switch 82. Let it be assumed that the clutch unit 69a has been energized. Since each of the clutch units 69a, 71a and 72a is similar in construction and operation, only the clutch unit 69a will be described in detail with corresponding parts being indicated by like numerals.

Figure 7:
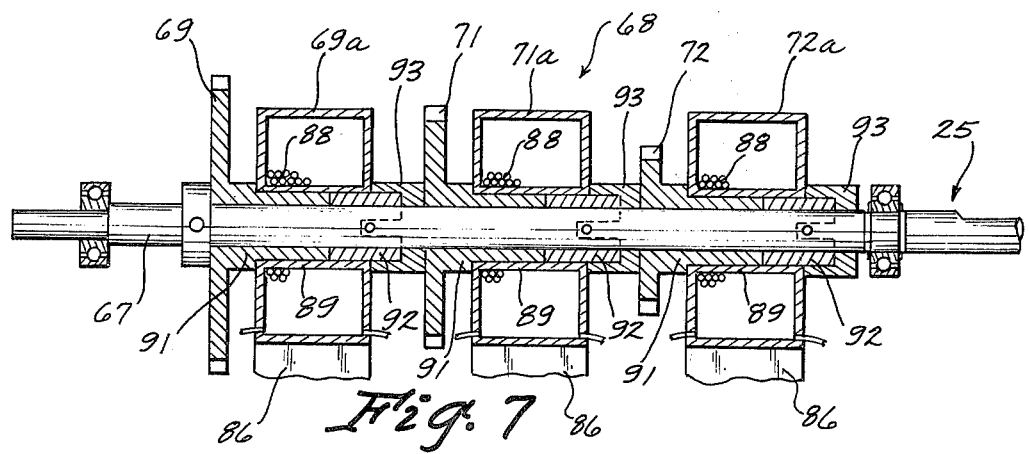

The clutch unit 69a (FIG. 2) is mounted on a bracket 86, suitably secured to the bottom wall 87 of the housing 23, and includes a solenoid coil 88 (FIG. 7) having a center core 89. The gear 69 has an axially extended hub 91 rotatable on the shaft 67 and projected within the core 89 for abutting engagement with a coupler sleeve 92 rotatable with the shaft 67 relative to the core 89. It is seen, therefore, that the core 89, which is composed of a non-magnetic material, functions as a bearing relative to the gear hub 91 and coupler 92. The end members 93 for the solenoid coil may be of a fiber composition. On energization of the coil 88, the abutting surfaces of the hub 91 and coupler sleeve 92 are magnetically attracted and connected to provide for the rotation of the gear 69 with the conveyor speed monitor shaft 67. The speed ratio of the shafts 27 and 67 is thus set at the ratio of the gear 69 to the gear 69b.

With the switches 75, 81 and 82 closed, linear travel of the vehicle 10 will initially rotate the ground speed monitor shaft 26 which, through the sensing unit 34, may rotate the actuating shaft 33 since the idler shaft 27 will not have been brought up to speed by the conveyor speed monitor shaft 67. This initial rotation of the actuating shaft 33 will result in the adjustment of the screw 51 of the flow regulating valve 20 to provide a wide open position of the adjustable opening 57 and a quick speeding up of the conveyor drive motor 18 to reduce to a minimum the time lag between the start of vehicle travel and the commencement of the sensing operation of the sensing unit 34.

At the wide open position of the adjustable opening 57, an actuator pin 94 on the worm gear 43 engages a normally open push button switch 96 on the housing side wall 47. Closing of the switch 96 energizes a light 90 on the instrument panel 83 (FIG. 8) to warn the vehicle operator that the vehicle ground speed is exceeding the capacity of the hydraulic system to monitor the shaft 67 and that such speed should be reduced until the warning light 90 goes off.

Following the initiation of truck travel and conveyor operation, any variation in the rotational speeds of the ground speed monitor shaft 26 and the idler shaft 27 results in a rotation of the bevel gears 38 and 39 about the common axis of the shafts 26 and 27 and in turn of a rotation of the actuating shaft 33. This rotation of the actuating shaft 33 is transmitted through the shaft 44 for adjustment of the screw 51 of the flow regulating valve unit 20. Depending upon the rotational direction of the actuating shaft 33 more or less fluid will be supplied to the conveyor motor 18 to in turn vary the rotational speed of the conveyor speed monitor shaft 67 until the rotational speed of the idler shaft 27 is the same as the rotational speed of the ground speed monitor shaft 26.

When the rotational speeds of the shafts 26 and 27 are the same, the reversed relative rotation of the gears 36 and 37 relative to the gears 38 and 39 will stop any further rotation of the bearing assembly 41 about the axis of the shaft 27 to in turn reduce to zero or make non-existent any rotational movement of the actuating shaft 33. With the shaft 33 stationary, the rate at which material is discharged by the conveyor 12 is in accordance with the predetermined ratio of rotational speed of the conveyor speed monitor shaft 67 with the ground speed of the truck 10, as initially set by the adjustment of the selector switch 82. The sensing unit 34 will operate continuously to maintain this predetermined speed ratio during a complete distributing operation.

When, during vehicle travel, operation of the conveyor 12 is not desired, the master control switch 81 is moved to its open position (FIG. 5) providing for the shut off by the solenoid valve 60 of oil under pressure to the regulating valve 20, and for the de-energizing of the speedometer clutch unit 79 and gear clutch units 69a, 71a and 72a. Oil under pressure from the pump 19 (FIG. 3) is thus bypassed directly through the solenoid valve 60 to the reservoir 59 to render the motor 19 inoperative.

When the vehicle is at rest the conveyor 12 may be operated independently of the synchronizing apparatus by closing the switch 81 and opening the switch 75 (FIG. 5). With the switch 75 open the clutch units 79, 69a, 71a and 72a are inoperative and the solenoid valve is in its normally open position to permit oil under pressure from the pump 19 (FIG. 3) being supplied through the flow regulating valve 20 to the conveyor motor 18. Although the motor 18 will also rotate the shaft 67, such shaft rotation will not impart any driving action to the gears 69, 71 and 72 because of the deenergized clutch units 69a, 71a and 72a.

Although the invention has been described with respect to a preferred embodiment thereof, it is to be understood that it is not to be so limited since changes and modifications can be made therein within the full intended scope of the invention as defined by the appended claims.

I claim:

1. In combination with a bulk material spreading vehicle having a material unloading conveyor, a vehicle engine driven oil pump unit in operative association with a hydraulic motor for driving said conveyor, and a speedometer having a flexible shaft, apparatus for synchronizing the rotational speed of the hydraulic motor to a predetermined ratio of the ground speed of the vehicle comprising:
   a. a housing mountable on said vehicle,
   b. a vehicle ground speed monitor shaft,
   c. a conveyor speed monitor shaft,
   d. an idler shaft reversely rotatable relative to said ground speed monitor shaft,
   e. means rotatably supporting said ground speed monitor shaft and idler shaft within said housing and in axially spaced relation,
   f. means rotatably supporting said conveyor speed monitor shaft within said housing in a parallel relation with said idler shaft,
   g. first means coupling said flexible shaft in a driving connection with said ground speed monitor shaft,
   h. second means coupling said hydraulic motor in a driving connection with said conveyor speed monitor shaft,
   i. a sensing unit located between the adjacent ends of said idler shaft and ground speed monitor shaft including a first rotatable means for sensing the difference in the rotational speeds of said idler shaft and ground speed monitor shaft and a second rotatable means rotated in response to said rotational difference,
   j. coacting means on said idler shaft and conveyor speed monitor shaft for selectively connecting said two shafts for rotation in a predetermined speed ratio, and
   k. control means for said hydraulic motor mounted on said housing and connected to said second rotatable means for adjusting the rotational speed of said conveyor speed monitor shaft to rotate said idler shaft at the rotational speed of said ground speed monitor shaft, said second rotatable means being non-rotatable when said ground speed monitor shaft and said idler shaft are synchronized at the same rotational speeds.

2. The combination according to claim 1 wherein:
   a. said idler shaft has an axially extended bore therethrough,
   b. an actuating shaft rotatable within said bore having an input portion and an output portion,
   c. means connecting said input portion with said second rotatable means, and
   d. means connecting said output portion with said control means.

3. The combination according to claim 2 wherein:
   a. the first rotatable means of the sensing unit comprises a gear assembly including a first pair of like gear members corresponding to and mounted on the adjacent ends of said idler shaft and ground speed monitor shaft, and a second pair of like gear members rotatable about a common axis extended transversely of the common axis of said idler shaft and ground speed monitor shaft and located between the adjacent ends thereof, each of said second pair of gear members being engaged with each of said first pair of gear members, and
   b. said second rotatable means including a bearing assembly for rotatably supporting said second pair of gear members mounted on the input portion of said actuating shaft to provide for the rotation of the common axis of said second pair of gear members about the common axis of said idler shaft and ground speed monitor shaft.

4. The combination according to claim 2 wherein:
   a. said control means includes a rotatable adjustable member, and
   b. said means for connecting the output portion of the actuating shaft with said control means includes a speed reduction unit interposed between said output portion and said adjustable member to provide for an appreciably reduced rotational speed of said adjustable member relative to the rotational speed of said actuating shaft.

\* \* \* \* \*